Nov. 30, 1965  G. C. THOMPSON, JR  3,220,262

SUPERCONDUCTING INERTIAL APPARATUS

Original Filed July 24, 1959  3 Sheets-Sheet 1

GEORGE C. THOMPSON JR.
INVENTOR.

BY
ATTORNEY

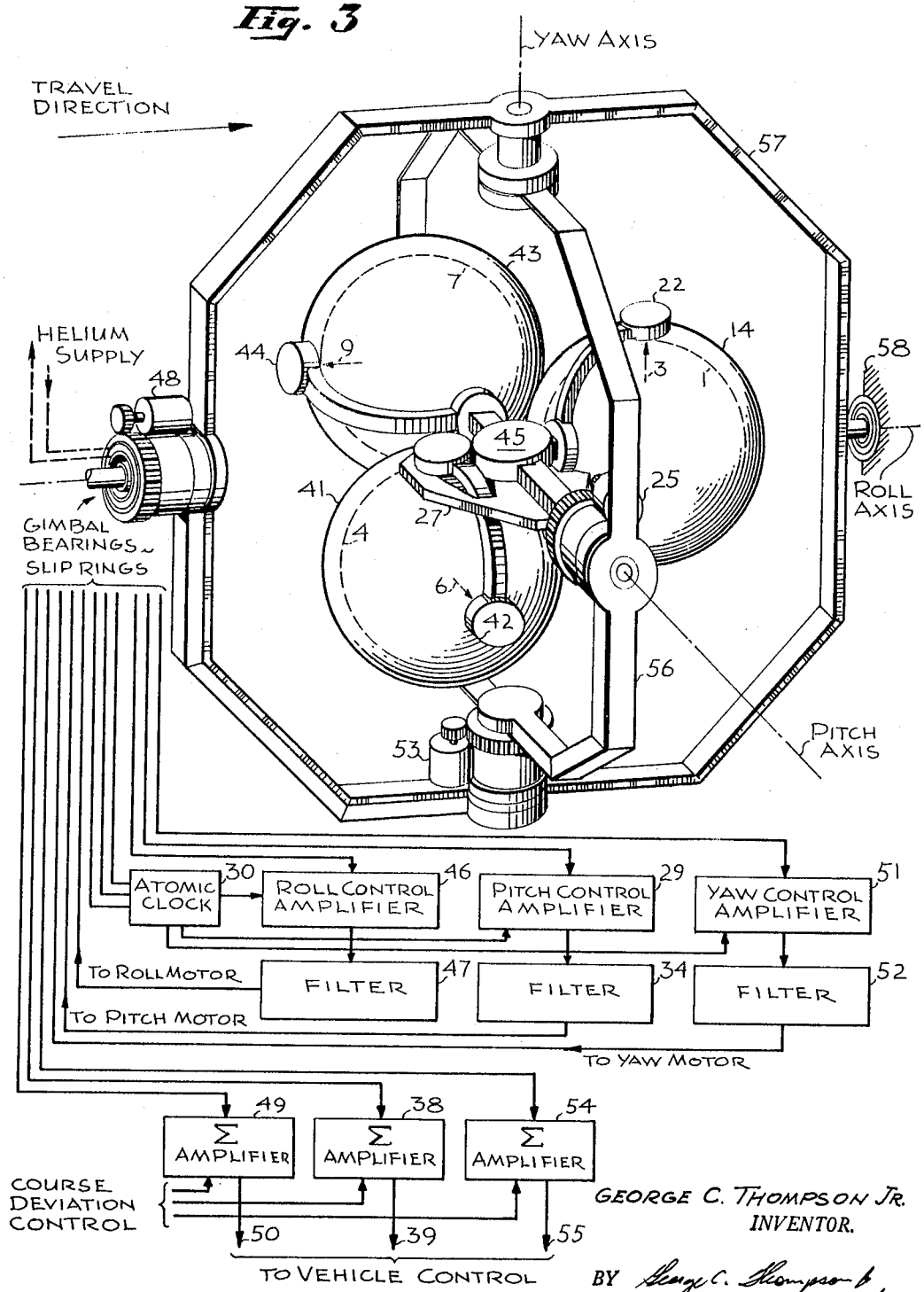

Nov. 30, 1965     G. C. THOMPSON, JR     3,220,262
SUPERCONDUCTING INERTIAL APPARATUS
Original Filed July 24, 1959     3 Sheets-Sheet 3
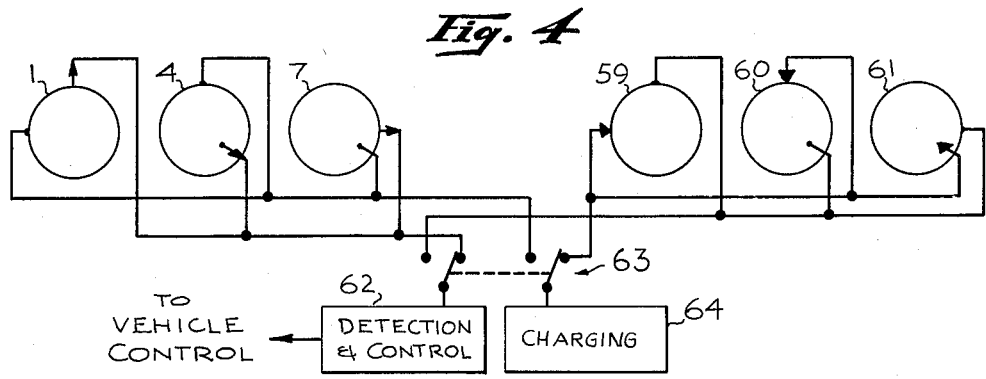
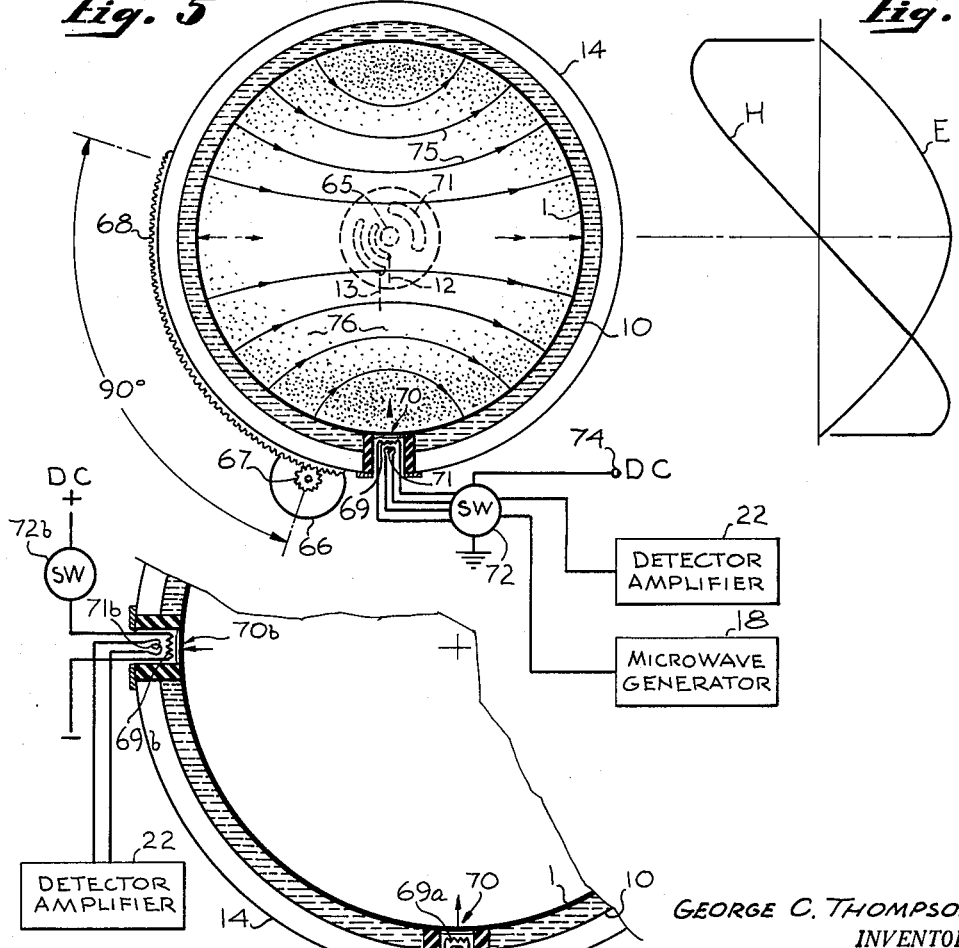
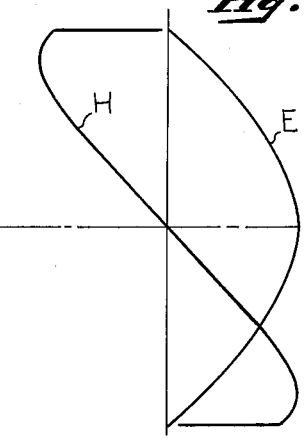
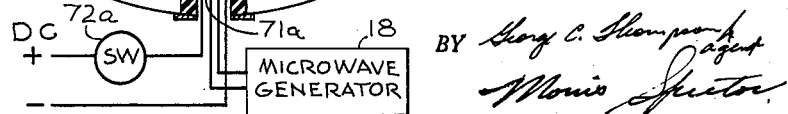

3,220,262
SUPERCONDUCTING INERTIAL APPARATUS
George C. Thompson, Jr., Simi, Calif., assignor to TRW Inc., a corporation of Ohio
Continuatiaon of application Ser. No. 829,368, July 24, 1959. This application Feb. 8, 1963, Ser. No. 257,818
9 Claims. (Cl. 73—505)

This invention relates to superconducting inertial apparatus and more particularly to an inertial reference system provided with superconducting cavities for continuously supplying yaw, pitch and roll references without interruption. This application is a continuation of my copending application "Superconducting Inertial Apparatus," Serial Number 829,368, filed July 24, 1959, now forfeited.

Some present well known systems capable of providing inertial guidance utilize either spinning masses or vibrating masses capable of operation in substantially fixed relative planes for the purpose of providing references for guidance purposes. However, due to spinning mass bearing friction or internal resistance of resilient members supporting the vibrating masses, a substantial amount of precession occurs causing errors in the guidance system reference. Many steps have been taken to reduce errors due to bearing friction such as, for example, providing a drive means for driving the outer races of the support bearings for a spinning mass in opposite directions. Although this provides some improved operational conditions, it is obvious that some bearing friction still exists and, therefore, causes the introduction of error into the guidance system.

It is, therefore, an object of this invention to provide a guidance system utilizing radio frequency waves within superconductive cavities as a continuous reference for each of the three major axes.

It is another object of this invention to provide a guidance system provided with a plurality of sets of duplicate superconducting cavities for duplicate directional references to allow for control by one set of cavities while recharging takes place in another set.

It is another object of this invention to provide an energy injection and detection means for each superconducting cavity that is capable of injection and detection through the cavity wall.

It is still another object of this invention to provide a means for rapidly switching an area in each superconducting sphere between resistive and superconducting condition to provide energy injection and detection operation.

It is still another object of this invention to provide a means for rapidly switching a plurality of areas in each superconducting sphere between resistive and superconducting condition to provide energy injection and detection operation.

Other objects, purposes and characteristic features will become clear as the description of the invention progresses.

In practicing this invention, there is provided a plurality of superconductive enclosures forming cavities capable of receiving radio frequency energy which is propagated through the wall of each cavity to form node positions within each cavity. The enclosures are positioned in fixed relationship with each other to represent the yaw, pitch and roll axes and arranged to provide continuous reference. Each cavity is provided with a detector means for detecting the node position through each cavity wall and to provide an output in response to a deviation of the detector means away from the node position. With the enclosures forming the cavities being freely gimbaled, and with each enclosure being provided with a drive mechanism for repositioning each in response to a deviation detection by its detector means, it is only necessary to provide a drive mechanism output for vehicle control in response to repositioning of each enclosure and drive means upon deviation detection by each detector. It should be pointed out at this time that the only cause of deviation of the enclosure cavities with respect to the injected radio frequency wave within each cavity is the movement of each enclosure about its radio frequency wave upon vehicle deviation from the desired course. In view of the fact that no bearing friction or windage exists within the enclosure cavities, no error is introduced in the reference waveforms.

FIGURE 3 is a diagrammatic view of three superconducting spheres mounted on a gimbaled platform and provided with a typical control system;

FIGURE 4 is a diagrammatic representation of the use of two systems for control and recharging;

FIGURE 5 is a view of another superconducting sphere provided with a common injection and detection opening;

FIGURE 6 is a graph showing the relationship existing at one instant between the electric field and the magnetic field within a sphere such as the sphere of FIGURE 5; and FIGURE 7 is a cutaway view removed from a portion of one of the superconductive spheres showing an injector and detector involving the principles of this invention.

In each of the several views similar parts bear like reference characters.

It has been known for many years that the electrical resistance of metal decreases with the lowering of temperature. With further experiments, however, it has been determined that certain materials apparently reduce their electrical resistance to approximately zero at temperatures approaching absolute zero. This phenomenon has been referred to as the superconductive qualities of the materials being used. By utilizing this superconducting quality in forming a cavity by an enclosure such as a sphere and then injecting into the cavity a radio frequency wave having a half wave length equal to substantially the diameter of the cavity ($\lambda \approx 2.29a$, where $a$ is the radius of the sphere), little or no energy is expended by the waveform energy that is propagated within the superconductive cavity. Long periods after the injection of the energy within the cavity, little or no attenuation of the energy would be detected.

There are several kinds of nodes; for example, there can be an electric field node, a magnetic field node as well as a current node. For the systems illustrated herein and graphically demonstrated in FIGURES 5 and 6 and for the wave propagation shown which is of the lowest order with the electric field shown flowing in the direction of the arrows, the maximum of the electric field will exist along the axis with the electric field falling to zero at the surface of this sphere. At the same time the magnetic field shown by the dots dispersed within the field area will be at zero along the axis and the maximum in an area adjacent the intersurface of the sphere.

Figure 1:
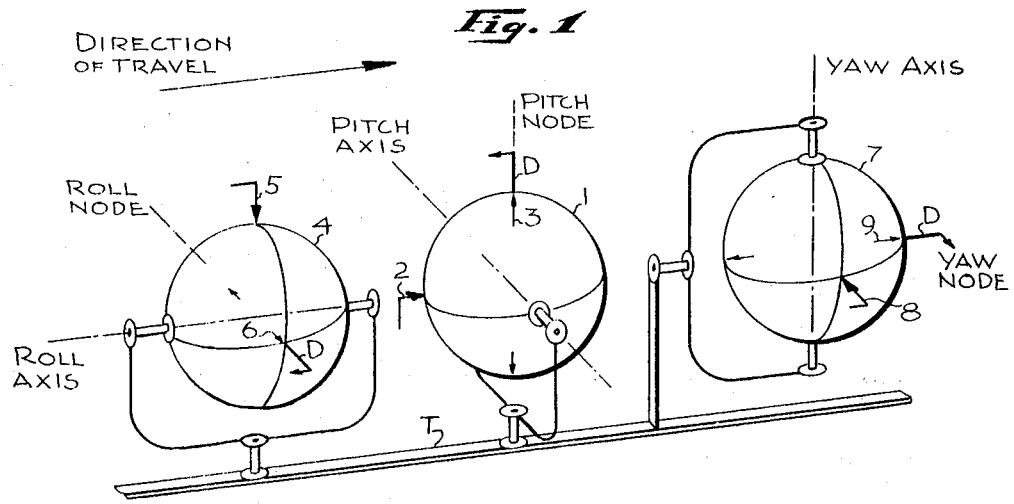
FIGURE 1 is a diagrammatic view of three spheres having waveforms injected therein at the proper positions to provide the three basic reference axes herein designated X, Y and Z.

If we now consider the schematic representation of FIGURE 1 it can be seen that if a radio frequency is injected into a spherical cavity such as formed by the sphere 1 at a point 2 and if the sphere 1 is electrically perfect, a magnetic field node will exist along a line indicated by the arrow 3. At this same point, a current node will exist in the surface of the sphere at one of the points 3. It is at one of the points 3 that a detector is introduced through the sphere 1 and since the detector is basically at the node position, little or no losses will occur. In addition to the sphere 1, if we also provide a sphere 4 with an energy injection point indicated at 5, a magnetic field node will exist along the line indicated by the arrow 6. Since the point of injection in this sphere 4 is displaced with respect to the point of injection in the sphere 1, this sphere is capable of operation in a different plane. In order to provide complete directional control, a third sphere is provided for detection in a third reference plane. For this purpose, the sphere 7 is provided having an injection point at 8 and a node detection for the magnetic field indicated by the arrows 9. With the three spheres, the three necessary reference planes are provided giving roll, pitch and yaw detection.

In FIGURE 1, the three spheres are shown mounted on gimbals supported on a single reference support or table T in order to clearly show the inter-related cooperation of the spheres. The gimbals for each of the spheres are provided to prevent excessive energy losses from the spheres due to a deviation of the vehicle from its desired course as will be explained hereinafter.

Figure 2:
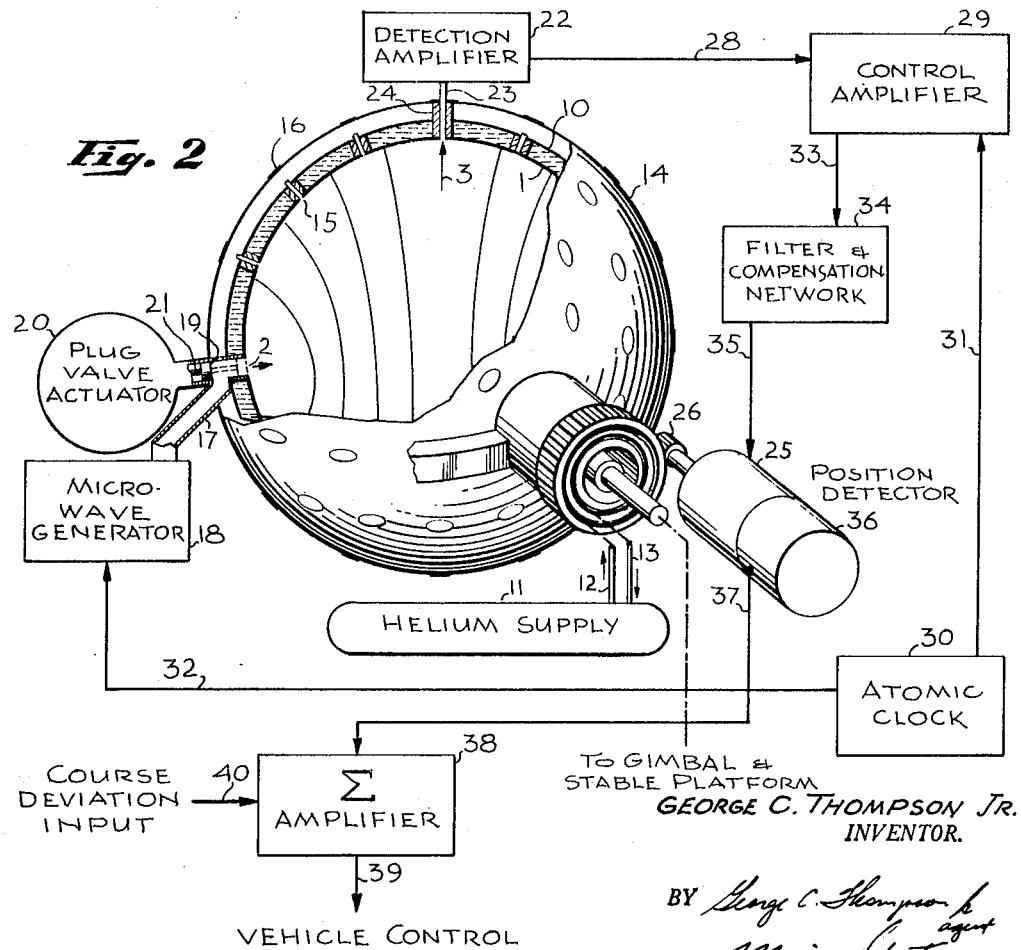
FIGURE 2 is a view of a typical superconductive sphere representing one of the planes and showing waveform injection, node detection and a typical control system.

In order to understand clearly what is necessary to provide a radio frequency waveform for one detection plane, a more detailed structure is presented in FIGURE 2 and is explained hereinafter. In FIGURE 2, the means for injection and detection of energy into and out of, respectively, the sphere 1 is shown to be in the form of waveguides. It is pointed out, however, that the energy may be injected and detected by other structures such as the heater and loop of FIGURE 5 which will be explained in more detail hereinafter.

The sphere 1 shown in FIGURE 2 is preferably formed of material capable of superconducting operation such as lead and capable of providing a high "Q" resonant chamber. Since, however, lead is inherently weak in structural strength, it is necessary to provide a structural sphere of some stronger material provided with a lead coating on the interior thereof of sufficient depth to provide for an energy change in the lead, when it goes superconducting, that is greater than the energy injected in radio frequency form. Although the cavity is herein shown as a sphere, it is pointed out that other shaped cavities also could be used.

Since the superconductive sphere is only superconducting at temperatures approaching absolute zero, it is necessary to supply this sphere with a cooling medium such as liquid helium. In order to contain the liquid helium about the superconductive sphere 1, an enclosing outer sphere 10 spaced from the sphere 1, is provided. The area between the inner sphere 1 and its adjacent outer sphere 10 is then filled with helium from a helium supply 11 piped into the cavity formed by the spheres 1 and 10 through suitable insulated pipes 12 and 13. Since the spheres 1 and 10 are supercooled to a point near absolute zero, it is necessary to insulate the spheres to prevent excessive losses. For protection against excessive thermal losses, a third sphere 14 is positioned about the sphere 10, and spaced therefrom. The area between the spheres 10 and 14 is then evacuated and sealed, thus forming a suitable vacuum bottle for preventing the losses.

Since a perfect electrical sphere can not readily be formed, it is necessary to provide suitable electrical shims 15 for adjusting the electrical quantities of the superconducting sphere 1 to be electrically perfect to an injected waveform. The shims are made available through suitable sealing plugs 16 in the evacuated sphere 14.

Several different modes of wave propagation within a sphere are possible. The one illustrated in the present application is commonly referred to as the lowest order of wave propagation within a sphere and is used as an illustration only since it is the simplest to demonstrate and understand. This mode of operation may be excited in several different ways such as by means of a magnetic coil, a dipole fed by a coaxial cable or a slot fed by a waveguide. Whatever the method used for exciting the sphere the feed mechanism should be made to disappear in order to reduce the losses that would be encountered by the mechanism remaining within the sphere.

In order to position the node of an injection waveform along the node line 3 of the superconducting sphere 1, the point of wave propagation or injection should be displaced therefrom by 90° and at a point that is relatively high in energy level in the magnetic field such as shown by the curve H in FIGURE 6. As shown in FIGURE 2, the point of injection 2 would be nearly at the maximum field potential level as shown by the curve H. The method of injection shown in FIGURE 2 involves the use of an opening 2 provided with a suitable waveguide 17 connected to an energy supply or microwave generator 18. In order to maintain the superconducting qualities of the sphere after injection of energy into the sphere, a suitable sealing plug 19 is provided and is movable from its open position, as represented in FIGURE 2, to a position forming a substantially smooth internal surface for the sphere 1. The plug valve 19 is moved by an actuator 20 connected to the plug valve 19 through a suitable link 21.

It, therefore, can be seen that with the plug valve 19 in its retracted position, energy can be emitted from the microwave generator 18 through the waveguide 17 into the sphere 1 and immediately following the energy entrance into the sphere the plug valve 19 can be rapidly moved to its sealing position. With the plug in position the energy is prevented from being expended back through the waveguide opening thus keeping losses to a minimum. In addition, the adjustable shims 15 can be moved in and out as is necessary to form an electrically perfect sphere.

At this point, we now have the radio frequency wave established with the superconductive sphere or container 1 with its node along the line 3. In order to provide a means of sensing movement of the superconductive sphere about the injected radio frequency energy, a detector amplifier 22 having a waveguide 23 entering through the sphere 1 along the node line 3 is provided. Waveguide 23 is provided with suitable insulation 24 for reducing thermal conduction losses to a minimum.

As long as the sphere 1 is maintained in the exact position occupied during waveform injection, the waveguide 23 will be positioned along the node line 3. If, however, the sphere is rotated, causing detector waveguide 23 displacement from the node position, energy will be passed through the waveguide 23 to the detection amplifier 22. A deviation of extremely small amounts from the node position will result in energy detection by the detection amplifier 22.

In order to keep losses to a minimum in the injected wave within the sphere 1, a suitable drive means or motor 25 is provided for returning the sphere to node position as soon as deviation occurs. The motor 25 is connected through suitable mechanical gearing linkage 26 to a sphere supporting platform T which is gimbaled for free directional movement such as shown in FIGURE 3. Under some conditions the sphere may be separately gimbaled (not shown). The motor 25 is driven in response to deviation detection by the detection amplifier 22 which provides an output through the output path 28 to a phase sensitive control amplifier 29. The control amplifier 29 is provided with a control input from a suitable reference means such as an atomic clock 30 over an input path 31.

A typical atomic clock is described in principle in the article by Harold Lyons appearing on page 71 of the February 1957 Scientific American. As described in this article, atomic clocks have been made using ammonia and cesium. In addition, "Maser" clocks have also been made using ammonia.

The purpose of the atomic clock 30 is to provide an exact reference for detecting phase relationship of the signal from the detector amplifier 22 for determining the direction of rotation of motor 25. In order to provide a phase or error reference, the atomic clock is used as a reference for the microwave generator 18 through a timing control path 32. The output signal of the detection amplifier 22 is compared with the output signal of the atomic clock 30 resulting in an output over the path 33 to suitable filters 34, capable of providing an output over path 35 to the motor 25. Movement of the motor 25 is then detected by a suitable deviation detector 36 which provides an output signal over the path 37 to a summation amplifier 38 capable of providing an output signal over the output path 39 for vehicle control.

The summation amplifier 38 is provided with an additional input path 40 for the purpose of directing a vehicle deviation from the original path. To provide this control an input signal is provided over the path 40 to the summation amplifier 38 which results in a vehicle output control over the path 39. As the vehicle begins to deviate from its original path the detector amplifier 22 detects the deviation and causes the control amplifier 29 to drive the motor 25 to reposition the sphere 1 and detector amplifier 22 to the node line 3. Movement of the motor 25 results in a signal from the deviation detector 36 to the summation amplifier 38. This signal, to the amplifier 38 over the path 37, eventually balances the input signal from the path 40 when the directed deviation of the vehicle from the original path has been satisfied.

The energy within the sphere 1, however, is not dissipated due to the new course since the detection amplifier 22 has been repositioned to the node of the injected waveform.

It is pointed out at this time that the detection amplifier 22 can be displaced in two different planes falling along the node line 3 thus resulting in a signal being detected by the amplifier 22. If, however, the system used is one involving a desired detection in one plane only, the electrical circuitry is such that the phase of the detected signal as compared to the atomic clock signal can be passed only when the deviation is in the proper plane. In order to prevent energy losses due to detection amplifier movement along the unwanted plane, the desired system utilizes a gimbaled platform T with detection spheres for each of the other planes also mounted thereon. With this arrangement deviation from node position in any plane will be rapidly corrected with detection resulting only in the desired sphere for each plane.

Referring now to FIGURE 3, there is shown a complete guidance system utilizing three superconductive spheres gimbaled for three axes rotation. In addition to the previously described pitch axis sphere 1 and its detector amplifier 22 there is provided for the roll detection superconductive sphere 4 a suitable evacuated shell such as a sphere 41 and a suitable detector amplifier 42. Similarly, the yaw detection sphere 7 is provided with a vacuum shell, such as a sphere 43, and a suitable detector amplifier 44. The microwave generator and plug valve control mechanisms are located within a suitable container 45 interconnecting the three spheres and will not be shown in detail since a typical schematic arrangement for one sphere has been shown and described hereinbefore.

The control system shown in the system of FIGURE 3, is a complete system for three sensing spheres similar to the single sphere described in connection with FIGURE 2. The system provides control by each of the spheres for the axes shown in FIGURE 3. For example, the pitch control sphere is provided with a pitch control amplifier 29, a filter compensation network 34, a pitch motor 25, a pitch summation amplifier 38 and a vehicle control output 39. Likewise, the roll axis control sphere 4 is provided with a detection amplifier 42, a roll control amplifier 46, suitable filters 47, a roll control motor 48, a roll summation amplifier 49 and a roll control output path 50. The yaw control is provided by the yaw control sphere 7, its detection amplifier 44, a yaw control amplifier 51, suitable filters 52, a yaw control motor 53, a yaw summation amplifier 54, and a yaw output vehicle control path 55. Each detector sphere and its control system acts to maintain platform T stabilized along its respective axes and with reference to the sphere injected energy by providing output signals to the axis drive motors which provide outputs to the vehicle control system over the respective output circuits 39, 50 and 55. The atomic clock provides reference signals for each of the control amplifiers and for the microwave generator or generators within the container 45.

The platform T is supported for pivotal movement on a suitable gimbal 56 which is in turn pivotally supported on a second support gimbal 57 which is also pivotally supported on a suitable vehicle support 58. The axes of rotation for the platform and each of the gimbals represent each of the three planes of sensing.

The diagrammatic view of FIGURE 4 represents the principle of providing a plurality of guidance groups described as two separate guidance system groups or systems which may be needed for long and extensive flight control. The sensing superconductive spheres 59, 60 and 61 provide duplicates for the sensing spheres 1, 4 and 7 respectively. This figure diagrammatically represents detecting and control as being accomplished by connecting the detecting circuits 62 to spheres 1, 4 and 7 through the control switch 63, while at the same time supplying charging energy through the charging circuit 64 to the spheres 59, 60 and 61.

At a suitable time period as determined by experience, the switch 63 can be reversed to provide guidance by the spheres 59, 60 and 61 while charging of the spheres 1, 4 and 7 takes place. The alternate charging and control of each of the groups can provide vehicle control over a substantially unlimited course.

In order to simplify the superconductive sphere for the purpose of maintaining energy losses to a minimum, it may be desirable to provide microwave injection and detection through the same device. The structure of FIGURE 5 shows one arrangement capable of accomplishing this result.

If we assume again that the sphere shown in this figure is the pitch control sphere 1, it can be seen that the sphere 1 is again provided with the surrounding spheres 10 and 14 for the purpose of providing helium cooling and evacuated zones as described in FIGURE 2. The helium supply, lines 12 and 13, are shown in phantom lines since it is necessary to provide the helium through a pivot platform support provided by the pivot 65. The pivot 65 is necessary in order to move the waveguide from injection position to detection position for the two different modes of operation on its platform (not shown in this figure). This repositioning is provided by a suitable control drive means or motor 66 provided with a pinion gear 67 meshed with a suitable linear rack type gear 68 mounted along a portion of the periphery of the evacuated shell 14.

The injection and detection device shown in FIGURE 5 comprises a thermal or heater element 69 for switching an area 70 in the sphere 1 between superconducting and resistive condition. In resistive condition the area 70 appears as an opening or window to a varying frequency. For this reason a resonant frequency having a wave length $\lambda \approx 2.29$ times the radius of the sphere can be propagated in each sphere. In view of this fact an injection and detector coil (or loop) 71 is positioned adjacent the area 70 to provide injection and detection of energy within the sphere 1 through the area 70. During injection of energy, such as microwave energy the selector switch 72 connects the microwave energy source 18 to the loop 71. At the same time the direct current source terminal 74 is connected to the heater element 69 by the switch 72.

It is pointed out that the loop 71 may also serve as the heater as well as the injector with the result that the separate heater 69 could be eliminated.

If it is assumed that the heater 69 and loop 71 is energized by the generator 18 causing the injection of a microwave frequency to take place it is only necessary to interrupt the direct current by the switch 72 to cause the resistive area 70 to be again switched to super-conducting state. This operation is completed with little or no energy loss. The injection operation establishes a wave pattern represented in FIGURE 5 by the typical electric field lines 75 and the magnetic field dots 76. After ceasing injection operation the motor 66 is energized to drive the sphere clockwise for 90°. When in the 90° position from that shown in FIGURE 5, the switch 72 is again operated to supply direct current to the heater 69 to provide the resistive area or "window" in the sphere 1 at the magnetic node position of the injected wave. The loop 71 is now in a position to receive energy from the injected microwave. If the sphere 1 is displaced in a direction moving the loop 71 away from node position, through deviation of the vehicle from its intended course, energy is then induced in the loop 71 and supplied to the amplifier 22.

FIGURE 6 is a graph showing schematically the energy levels found within the sphere of FIGURE 5, at one instant. As shown here the ordinate axis represents the energy axis while the abscissa directly corresponds to the diameter of the sphere. With H representing the magnetic field and E representing the electric field, it can be seen that the sphere as shown in FIGURE 5 would have zero magnetic field along a center axis that is horizontal in the position shown in FIGURE 5 while the electric field represented by E is at a maximum at this point. It is also clear that the electric field falls to zero at the top and bottom of the sphere as positioned in FIGURE 5 while the magnetic field is just slightly below its highest potential point. It should further be clear, therefore, that after injection of energy by loop 71 into the sphere 1, and rotation of the loop 71 to a position to 90° from the position shown in FIGURE 5, the loop 71 would be at the point of zero magnetic field potential, since the sphere is rotated about the propagated wave therein.

It is pointed out that the motor 66 moves the sphere 1 and its outer shells 10 to 14 through 90° only, and at this time is deenergized and maintains the sphere in this 90° position with respect to the platform until such time energy injection is again necessary. At this time the motor 66 is again energized in the opposite direction to return the sphere to the original position for energy injection. The motor control circuit is not shown since any well known control would be suitable.

The pivot point 65, is not shown in detail since any suitable pivot may be used. It is pointed out, however, that in addition to the helium supply pipes a passage 71 is necessary for the supply and return of power and signal energy.

In some conditions it may be desirable to have the heater 69 and loop 71 subjected to a limited supply of cooling helium for faster switching. With the elements 69 and 71 being continuously cooled it is necessary that they be constructed of a material remaining resistive at all times.

The arrangement of FIGURE 7 sets forth separate injector and detector areas for each sphere, which is necessary for a system such as shown in FIGURES 2 and 3. The injection area 70 in the sphere 1 is made resistive or non-resistive by the energization or deenergization of the heater 69a at the desired switch 72a selected time. During resistive periods of the area 70 the microwave source 18 is supplying energy to the loop 71a.

Positioned 90° from the injection area 70 is a detection controlled resistive area 70b. The area 70b is also provided with a pickup loop 71b and a heater 69b, with the heater being controlled by the switch 72b. The operation of the separate injector and detector devices is the same as the operation of the device of FIGURE 5 when in its injection and detection positions, respectively, except for the fact that the two functions are separated into two devices with a single path switch for each heater. The loops 71a and 71b could also be switch controlled, however, no operation can take place until the areas 70 and 70b are made resistive.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. An inertial guidance system comprising two guidance groups, each group having a plurality of superconducting means each of which defines a movable electrical cavity, energy injection means associated with each of said plurality of superconducting means for injecting energy in each said cavity to establish a resonant wave having a predictable magnetic node position, energy detection means mounted on each cavity and initially positioned at the originally established resonant wave magnetic node position, switch control means for providing energy injection in one of said groups while energy detection is taking place in the other of said groups, said energy injection and detection means comprising a thermal means for causing a portion of each of said superconducting means to become resistive and loop means associated with each said thermal means for providing energy injection and detection operation.

2. An inertial guidance system providing a plurality of guidance groups, each group having a plurality of superconducting means, each of said plurality of superconducting means defining a movable cavity, energy injection means associated with each of said plurality of superconducting means for injecting waveform energy in each said cavity to establish a resonant wave having a predictable magnetic node position, energy detection means mounted on each cavity and initially positioned at the originally established resonant wave magnetic node position, switching control means for providing energy injection in one of said plurality groups while energy detection is taking place in another of said plurality of groups, said energy injection and detection means comprising a thermal means for causing a portion of each of said superconducting means to become resistive and loop means associated with each said thermal means for providing energy injection and detection operation.

3. In an inertial guidance system comprising a plurality of superconducting means defining a plurality of movable superconducting cavities, energy injection means associated with each of said plurality of superconducting means for injecting waveform energy in each cavity to establish a resonant wave having a predictable magnetic node position, energy detection means mounted on each cavity and initially positioned at the originally established resonant wave magnetic node position, said energy injection and detection means comprising, a means for causing at least one area in each container to become resistive, flux producing and detecting means positioned adjacent said resistive area, and means for energizing said injection and detection means for making such superconducting container areas resistive for injection and detection purposes.

4. In an inertial guidance system comprising a plurality of superconducting means defining a plurality of movable superconducting cavities, energy injection means associated with each of said plurality of superconducting means for injecting waveform energy in each cavity to establish a resonant wave having a predictable magnetic node position, energy detection means mounted on each cavity and initially positioned at the originally established resonant wave magnetic node position, said energy injection and detection means comprising, a means for causing at least one area in each cavity to become resistive, flux producing and detecting means positioned adjacent said resistive area, and means for energizing said injection and detection means for making such superconducting cavity areas resistive for injection and detection purposes, said injection and detection means being positioned externally of said superconducting cavity.

5. In an inertial guidance system comprising a plurality of superconducting means defining a plurality of movable superconducting cavities, energy injection means associated with each of said plurality of superconducting means for injecting waveform energy in each cavity to establish a resonant wave having a predictable magnetic node position, energy detection means mounted on each cavity and initially positioned at the originally established resonant wave magnetic node position, said energy injection and detection means comprising, a means for causing at least one area in each cavity to become resistive, flux producing and detecting means positioned adjacent said resistive area, and means for energizing said injection and detection means for making such superconducting cavity areas resistive for injection and detection purposes, said injection and detection means providing electrical openings in said superconducting cavity without providing physical openings therein.

6. In an inertial guidance system comprising a plurality of superconducting means defining a plurality of movable superconducting containers forming cavities, microwave energy injection means associated with each of said plurality of superconducting means for injecting waveform energy in each cavity to establish resonant waves having mutually perpendicular node positions, energy detection means positioned on each cavity at the originally established node position for detecting movement of the cavities about mutually perpendicular axes, said energy injection and detection means comprising a control means for selectively causing at least one area in each superconducting container to become resistive, loop means positioned adjacent said resistive area for acting at one time to provide waveform energy injection into its adjacent container and at another time provide energy detection of the waveform within said container.

7. In an inertial guidance system comprising a plurality of superconducting means defining a plurality of movable superconducting containers forming resonant cavities, energy injection means associated with each of said plurality of superconducting means for injecting waveform energy in each cavity to establish resonant waves having mutually perpendicular node positions, energy detection means positioned on each cavity at the originally established node position for detecting movement of the cavities about mutually perpendicular axes, said energy injection means comprising a thermal switching means for causing one area in each superconducting container to become resistive, flux producing means positioned adjacent the external surface of said resistive area, and microwave generating means connected to said flux producing means for inducing microwave energy within each said container.

8. In an inertial guidance system comprising a plurality of superconducting means defining a plurality of movable superconducting containers forming resonant cavities, energy injection means associated with each of said plurality of superconducting means, for injecting waveform energy in each cavity to establish resonant waves having mutually perpendicular node positions, energy detection means positioned on each cavity at the originally established node position for detecting movement of the cavities about mutually perpendicular axes, said energy detection means comprising thermal switching means for causing one area in each container to become resistive, flux detecting means positioned adjacent to said resistive area in each said superconducting container, detector amplifier means connected to said flux detector means for sensing any waveform energy within each said container.

9. In an inertial guidance system comprising a plurality of superconducting means defining a plurality of superconducting containers forming resonant cavities, energy injection means associated with each of said plurality of superconducting means for injecting waveform energy in each cavity to establish resonant waves having mutually perpendicular node positions, energy detection means positioned on each cavity at the originally established node position for detecting movement of the cavities about mutually perpendicular axes, said energy injection means comprising a thermal switching means for causing one area in each superconducting container to become resistive, flux producing means positioned adjacent the external surface of said resistive area, and microwave generating means connected to said flux producing means for providing microwave energy within each said container, said energy detection means comprising second thermal switching means for causing another area in each said container to become resistive, flux detecting means in said energy detecting means positioned adjacent to said another resistive area in each said superconducting container for detecting waveform energy in each container when the node is displaced, detector amplifier means connected to said flux detector means.

References Cited by the Examiner

UNITED STATES PATENTS 2,914,736  11/1959  Young _____ 307—88.5

OTHER REFERENCES

An article from Space/Aeronautics, May 1959, entitled "Researchers Explore Exotic Gyros," by J. Holahan.

RICHARD C. QUEISSER, *Primary Examiner.*

JAMES J. GILL, *Examiner.*